US009731996B1

(12) United States Patent
Walsh et al.

(10) Patent No.: US 9,731,996 B1
(45) Date of Patent: Aug. 15, 2017

(54) METHOD OF MAKING CONTROLLED PORE GLASS

(71) Applicant: Integrated DNA Technologies, Inc., Skokie, IL (US)

(72) Inventors: Shawn Walsh, Williamsburg, IA (US); Kye Roth, North Liberty, IA (US); William E. Martin, III, Coralville, IA (US); Shawn Allen, Williamsburg, IA (US)

(73) Assignee: INTERGRATED DNA TECHNOLOGIES, INC., Skokie, IL (US)

( * ) Notice: Subject to any disclaimer, the term of this patent is extended or adjusted under 35 U.S.C. 154(b) by 0 days.

(21) Appl. No.: 14/876,861

(22) Filed: Oct. 7, 2015

Related U.S. Application Data

(60) Provisional application No. 62/061,042, filed on Oct. 7, 2014.

(51) Int. Cl.
 *C03C 11/00* (2006.01)
(52) U.S. Cl.
 CPC .................. *C03C 11/005* (2013.01)
(58) Field of Classification Search
 CPC ...... C03C 13/005; C03C 25/68; C03C 11/005
 USPC ..................................... 65/31, 429
 See application file for complete search history.

(56) References Cited

U.S. PATENT DOCUMENTS

| 2,106,744 | A | | 2/1938 | Hood et al. | |
| 2,215,039 | A | | 9/1940 | Hood et al. | |
| 2,221,709 | A | | 11/1940 | Hood et al. | |
| 3,549,524 | A | | 12/1970 | Haller | |
| 3,758,284 | A | | 9/1973 | Haller | |
| 3,843,341 | A | | 10/1974 | Hammel et al. | |
| 3,972,721 | A | * | 8/1976 | Hammel | B01D 67/0058 501/33 |
| 4,778,499 | A | * | 10/1988 | Beaver | C03C 25/68 501/38 |
| 5,919,523 | A | | 7/1999 | Sundberg et al. | |
| 6,995,259 | B1 | | 2/2006 | Vargeese et al. | |
| 7,777,023 | B2 | | 8/2010 | Vargeese et al. | |

* cited by examiner

*Primary Examiner* — Alison L Hindenlang
*Assistant Examiner* — Mohamed K Ahmed Ali
(74) *Attorney, Agent, or Firm* — Michael Best & Friedrich LLP

(57) ABSTRACT

This disclosure provides methods of manufacturing a controlled pore glass, including: (a) adding an acidic solution to a column containing borosilicate glass; (b) flushing the column from step (a) with an aqueous solution until the pH of the effluent is greater than about 6; (c) adding a basic solution to the column from step (b); and (d) flushing the column from step (c) with an aqueous solution until the pH of the effluent is less than about 9 to produce a controlled pore glass.

9 Claims, No Drawings

METHOD OF MAKING CONTROLLED PORE GLASS

CROSS-REFERENCE TO RELATED APPLICATIONS

This application claims priority to U.S. Provisional Patent Application No. 62/061,042, filed Oct. 7, 2014, the entire contents of which is incorporated herein by reference.

BACKGROUND

Controlled pore glass is generally made from borosilicate glass. The general method for removing the soluble phase consists of bringing the phase separated borosilicate glass into contact with an aqueous solution. One such leaching treatment consists of placing the phase separated and annealed borosilicate glass into a hot water bath followed by subsequent acid leaching and water wash (see U.S. Pat. No. 3,843,341, the complete disclosure of which is hereby incorporated by reference). Other procedures describe a multistep leaching procedure consisting of: 1) contact with an acidic solution; 2) water wash; 3) contact with an alkaline solution; 4) water wash; 5) contact with a second acidic solution; and 6) a boiling water wash. (See U.S. Pat. No. 3,549,524, the complete disclosure of which is hereby incorporated by reference).

CPG is often used in applications such as adsorption, filtration and separation membranes. Additionally, CPG is often used in solid phase synthesis or solid phase extraction procedures. CPG offers a number of advantages over other solid phase materials, such as, chemical stability, high strength, and stability in organic solvents, high surface area, uniform pore size and uniform pore distribution.

CPG is amenable to a number of derivitization or functionalization procedures. These derivitization or functionalization procedures consist of chemically bonding organosilanes. (See U.S. Pat. No. 5,919,523, the complete disclosure of which is hereby incorporated by reference). The chemically reactive organosilanes then serve as an attachment point to covalently link a number of organic molecules. The surface modification provides linkages that are chemically stable and sufficiently long to decrease steric interference form the support. For example, CPG undergoing an epoxy silane or isothiocyante treatment will serve as an attachment point for $NH_2$-modified oligos.

Currently there are a number of solutions for manufacturing controlled pore glass which require 1) heat treatment of borosilicate glass to phase separate and 2) leaching the phase separated borosilicate glass with aqueous solutions. Additionally, further treatment with alkaline aqueous solutions, such as, NaOH is often required. After each leaching step a significant quantity of wash is required to wash and flush the acidic leaching solution, alkaline leaching solutions and any remaining soluble materials. Some methods attempt to reduce the total number of treatments steps or precipitate leached borate (See U.S. Pat. No. 3,843,341, the complete disclosure of which is hereby incorporated by reference), but these solutions fail to meet the needs of the industry because large quantities of waste water is produced following leaching procedures.

It would be desirable to have a method of manufacturing CPG from phase separated borosilicate glass which can be used to reduce leach waste byproducts. It would also be desirable to have a method of manufacturing that would reduce the total volume of water required to manufacture CPG. It would also be desirable to have a method of manufacturing that would permit the discharge of waste products directly into publically owned treatment works. And finally it would be desirable to have a method of manufacturing that would reduce the quantity of wash water that must be treated before disposing into publically owned treatment works.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The present disclosure provides methods of manufacturing a controlled pore glass, including: (a) adding an acidic solution to a column containing borosilicate glass; (b) flushing the column from step (a) with an aqueous solution until the pH is greater than about 6; (c) adding a basic solution to the column from step (b); and (d) flushing the column from step (c) with an aqueous solution until the pH is less than about 9 to produce a controlled pore glass. The present disclosure thus provides for the manufacture of controlled pore glass in a column rather than using a reaction vessel. Among other things, these methods provide for making controlled pore glass (CPG) using substantially less acidic and basic treatment solutions and wash water relative to conventional processes. Moreover, despite performing the process in a column, it was surprisingly found that batches of controlled pore glass particles were produced having a narrow pore size distribution. This was unexpected, due to the reaction and flow dynamics that exist within a column.

Generally, controlled pore glass can be formed through a process involving first acid leaching, and then alkaline leaching. More specifically, borosilicate glass may be contacted with an acid leaching solution to dissolve the soluble borosilicate phase of the borosilicate glass, thus leaving the insoluble silica rich phase in place. In some embodiments, this acidic solution treatment (i.e., boron phase dissolution) may be driven to completion with heat. The insoluble silica rich phase forms a network of interconnected pores, where the temperature of the acidic leaching solution, as well as the time of contact between the borosilicate glass and the acidic solution, affects the pore size. Excessive treatment of the borosilicate glass with the acidic leaching solution may lead to the formation of CPG that is structurally weak and brittle. Following acid leaching, the remaining borosilicate glass is composed of silica and remaining colloidal silica particles. The colloidal silica particles, if desired, may be removed by an alkaline leaching solution followed with a water wash. In some methods, the resulting porous silica structure may be greater than about 95% $SiO_2$.

Borosilicate glass suitable for use in the methods of the present disclosure may be prepared from a composition of $RO$—$B_2O_3$—$SiO_2$, where RO includes one or more oxides of any alkaline earth metal, alkali metal or heavy metal, including, but not limited to $Li_2O$, $Na_2O$, $Al_2O_3$, $K_2O$, $BaO$, $CaO$, $MgO$, $SrO$ and $BeO$. The borosilicate glass may include between about 50% and about 75% $SiO_2$, between about 1% and about 10% $Na_2O$, and the remainder $B_2O_3$. In some embodiments, the borosilicate glass may be ground borosilicate glass. Alternatively or additionally, the borosilicate glass may be phase-separated borosilicate glass. The borosilicate glass may have average diameters between about 30 and about 500 microns.

According to the present methods, the borosilicate glass is first placed into a column. The column may be substantially cylindrical, having openings at each end for receiving/removing solid and liquid materials, such as glass particles, and aqueous leaching solutions for converting borosilicate glass to controlled pore glass. The column may have an internal diameter between about 4" and about 24" and a height between about 6" and about 36". Each end of the column further may include one or more devices for preventing solid and/or liquid materials from passing through the opening at that end. For example, at least one end may include a porous material (e.g., a filter, frit, membrane, or any other suitable material) that inhibits or prevents glass particles from passing through the opening while allowing liquids to pass through the material. Alternatively or additionally, each end may include a valve that selectively allows materials to flow through the opening. The column may adapted to be pressurized, such as to pressures of between about 1 psi and about 100 psi. The column also may be adapted to be heated to temperatures between about 30° C. and about 75° C. The column may be formed of any suitable material consistent with its function, including, but not limited to CPVC, glass, PFA or PTFE. The column also may include a jacket or outer coating, which may be formed of a variety of materials, including, but not limited to stainless steel, carbon steel, aluminum or hastelloy, to allow for using the column elevated temperatures and pressures.

The borosilicate glass is then contacted with an acidic solution by adding the solution to the column, whereupon the acid leaching solution dissolves the soluble borosilicate phase of the borosilicate glass, as described above. The acidic solution may be any strong acid, including, but not limited to, HCl, $H_2SO_2$, $HNO_3$, and may have an acid concentration ranging from about 0.1M to about 5M. The acidic solution may remain in contact with the phase-separated borosilicate glass for between about 10 minutes and about 48 hours, such as between about 2 hours and about 24 hours. In some embodiments, the acidic solution may be contacted with the borosilicate glass at ambient temperature, whereas in other embodiments, the acidic solution may be heated to a temperature up to about 100° C. (e.g., 50° C., 55° C., 60° C., 65° C., 70° C., 75° C., or any other suitable temperature between ambient temperature and 100° C.) to increase the rate of the leaching reaction. To facilitate the leaching reaction, a flux may be produced between the borosilicate glass and the acidic solution. For example, after adding the acidic solution to the column, the acidic solution may be bubbled gently within the column. Alternatively or additionally, the acidic solution may be passed through the column where it may be collected as waste or recirculated back through the column. In some embodiments, the acidic solution may be pumped through the column at pressure, such as at a pressure of between about 1 psi and about 100 psi.

After performing the acid-leaching reaction, the column is flushed with an aqueous solution to wash the acid-leached borosilicate glass and neutralize the acid. Specifically, the acid-leached borosilicate glass is washed until the pH of the effluent is greater than about 6. The aqueous solution may be water (e.g., deionized water), or may be a mild buffer solution to neutralize and remove the strong acid, including, but not limited to carbonate buffers or borate buffers. In some embodiments, the aqueous wash solution may be contacted with the acid-leached borosilicate glass at ambient temperature, whereas in other embodiments, the aqueous wash solution may be heated to a temperature up to about 100° C. (e.g., 50° C., 55° C., 60° C., 65° C., 70° C., 75° C., or any other suitable temperature between ambient temperature and 100° C.). In some embodiments, the aqueous wash solution may be pumped through the column at pressure, such as at a pressure of between about 1 psi and about 100 psi.

After washing with the aqueous solution, the washed acid-leached borosilicate glass is contacted with an alkaline solution by adding the solution to the column, whereupon the alkaline leaching solution reacts with the washed-leached borosilicate glass to form an alkaline-leached glass. The alkaline solution may be any strong base, including, but not limited to NaOH, KOH or LiOH, and may have an alkaline concentration ranging from about 0.1M to about 1M. The alkaline solution remained in contact with the washed acid-leached borosilicate glass for between about 0.5 hour and about 24 hours, such as between about 1 hour and about 6 hours. Similar to the acid leaching step, a flux may be produced between the glass particles and the alkaline solution, such as by bubbling the alkaline solution within the column, or by passing the alkaline solution through the column. In some embodiments, the alkaline solution may be pumped through the column at pressure, such as at a pressure of between about 1 psi and about 100 psi.

After performing the alkaline-leaching reaction, the column is again flushed with an aqueous solution to wash the alkaline-leached glass and to neutralize the base. Specifically, the alkaline-leached glass is washed until the pH of the effluent is less than about 9. The aqueous solution may be water (e.g., deionized water), or may be a mild buffer solution to neutralize and remove the strong base, including, but not limited to carbonate buffers or borate buffers. In some embodiments, the aqueous wash solution may be pumped through the column at pressure, such as at a pressure of between about 1 psi and about 100 psi.

The resultant controlled pore glass (CPG) will have a structure that depends on the structure of the initial borosilicate glass, as well as the reaction conditions used during the acid and alkaline leaching steps. The CPG may include particles having an average diameter between about 1 and about 500 microns. The CPG may have a porosity of between about 30% and about 75%, with an average pore size ranging between about 10 nm and about 1,000 nm, such as, for example, between about 25 nm and about 500 nm. The surface area of the CPG may range from between about 10 $m^2/g$ to about 350 $m^2/g$, depending on the pore size. The tap density of the CPG may be about 0.25 g/ml to about 0.40 g/ml. The CPG formed according to the methods disclosed herein may have a narrow pore size distribution, such that at least about 75% of the CPG particles have pore sizes within about ±25% of the average pore size. In some embodiments, at least about 90% of the CPG particles have pore sizes within about ±25% of the average pore size.

Additional leaching steps with additional acidic or alkaline solutions may be performed to further aid in dissolution of the borosilicate rich phase and the removal of colloidal silica particles. Further, the method may include removal of one or more acidic, alkaline or wash solutions by purging the column with an inert gas (e.g., nitrogen).

Using a column to prepare CPG from borosilicate glass allows for the use of substantially less acidic solution, alkaline solution and aqueous wash solution than in convention processes for forming CPG. It should be noted, however, that it was unknown whether a column could be used to prepare CPG particles where the various particles in a batch have consistent structures. More specifically, it was surprising that CPG particles having a narrow pore size distribution could be formed from borosilicate glass having a narrow pore size distribution. Those of skill in the art will appreciate that the flow of fluids through a column is highly dynamic and nonuniform. As such, it could not have been predicted whether a column could be used to prepare CPG particles where the various particles in the batch have consistent structures The invention is further described in the non-limiting examples below.

Example 1. Removal of Soluble Borosilicate Rich Phase 75 g of ground borosilicate glass (53-180 μm) was placed in a 500 ml glass peptide synthesis vessel. 375 ml of a 3M HCl solution was poured into the reaction column and bubbled gently with air for six hours in ambient conditions. The HCl solution was removed via vacuum through bottom frit of the column. The borosilicate glass was washed with 75° C. diH$_2$O until the pH of the effluent was >5. 375 ml of a 0.6M HCl solution was poured into the reaction column and bubbled gently with air for four hours. The HCl solution was removed via vacuum through the bottom frit of the reaction column. The column was washed with 75° C. diH$_2$O until the pH of the effluent was >6. 375 ml of a 0.5M NaOH solution was poured into the reaction column and bubbled gently with air for four hours. The NaOH solution was removed via vacuum through the bottom frit of the reaction column. The reaction column was washed with room temperature diH$_2$O until the pH of the effluent was <9. 375 ml of a 0.5M NaOH solution was poured into the reaction column and bubbled gently with air for 4 hours. The NaOH solution was removed via vacuum through the bottom frit of the reaction column. The reaction column was washed with room temperature diH$_2$O until the pH of the effluent was <8.

After the final washing step, the resultant CPG was analyzed, and was determined to have a tap density of 0.29 g/ml.

Example 2. Medium Scale Leaching Method 600 g of ground borosilicate glass (53-180 μm) was placed into a 1 L glass automated reaction column with frits on both the top and bottom of the column. The column was filled with 3M HCl. The HCl was pumped and circulated for 5 hours at 75° C. at 100 ml/minute using a diaphragm pump with a pressure of up to 60 psi. The column was washed with 75° C. di H$_2$O until the pH of the effluent was >5. The column was filled with 0.6M HCl and the HCl solution was circulated for 5 hours at 75° C. at 100 ml/minute using a diaphragm pump with a pressure of up to 60 psi. The column was washed with 75° C. di H$_2$O until the pH of the effluent was >6. The column was filled with 0.5M NaOH and the solution was circulated for 4 hours at room temperature. The column was washed with room temperature diH$_2$O until the pH of the effluent was <8.

After the final washing step, the resultant CPG was analyzed, and was determined to have an average pore size of 1,056 Å.

Example 3. Medium Scale Leaching Method to Remove Borosilicate Rich Phase 1,200 g of ground borosilicate glass (53-180 μm) was placed into a 2 L CPVC lined stainless steel automated reaction column with frits on both the top and bottom of the column. 5 L of 0.6M HCl was circulated through reaction column while the column is heated to 75° C. at 100 ml/minute using a diaphragm pump with a pressure of up to 60 psi. The column was filled with 3M HCl and the solution was circulated for 4 hours at 75° C. at 100 ml/minute using a diaphragm pump with a pressure of up to 60 psi. The reaction column was flushed with nitrogen gas. The column was washed with 75° C. di H$_2$O until the pH of the effluent was >6. The column was filled with 0.5M NaOH and the NaOH was circulated for 2.5 hours at room temperature at 100 ml/minute using a diaphragm pump with a pressure of up to 60 psi. The reaction column was flushed with nitrogen gas. The column was washed with room temperature diH$_2$O until the pH of the effluent was <8.

After the final washing step, the resultant CPG was analyzed, and was determined to have an average pore size of 955 Å.

Example 4. Large Scale Method 15 kg of ground borosilicate glass (53-180 μm) was placed in a 33 L CPVC lined stainless steel automated reaction column with frits on both the top and bottom of the column. 40 L of 0.6M HCl was pumped through the borosilicate glass bed at 1 L/minute using a diaphragm pump with a pressure of up to 100 psi to reduce the borate concentration in the solution as the column was heated to 65° C.–70° C. to eliminate the boron precipitate by removing a large portion of the boron phase before starting the recirculation. The column was filled with 3M HCl by pump and the solution was circulated through the system for 19 hours at 65° C.–70° C. at 1 L/minute using a diaphragm pump with a pressure of up to 100 psi. The column was washed with 30 L 3M HCl. The column was flushed with nitrogen gas and washed with diH$_2$O at 65-75° C. until the pH of the effluent was >6. The column was filled with 0.5M NaOH and the NaOH was circulated for 4 hours at room temperature at 1 L/minute using a diaphragm pump with a pressure of up to 100 psi. The column was flushed with nitrogen gas and washed with diH$_2$O at room temperature until the pH of the effluent was <8.

After the final washing step, the resultant CPG was analyzed, and was determined to have an average pore size of 1,098 Å.

What is claimed is:

1. A method of manufacturing a controlled pore glass comprising:
   a. adding an acidic solution to a cylindrical column containing borosilicate glass;
   b. flushing the column from step (a) with an aqueous solution until the pH of effluent flowing out of the column is greater than about 6;
   c. adding a basic solution to the column from step (b); and
   d. flushing the column from step (c) with an aqueous solution until the pH of effluent flowing out of the column is less than about 9 to produce a controlled pore glass having a structure that differs from the borosilicate glass of step (a), wherein at least about 75% of the controlled pore glass have pore sizes within about ±25% of the average pore size.

2. The method of claim 1, wherein the column is under pressure.

3. The method of claim 1, wherein the aqueous solution of step (b) is above 50° C.

4. The method of claim 1, wherein the aqueous solution of step (d) is above 50° C.

5. The method of claim 1, wherein the borosilicate glass is ground borosilicate glass.

6. The method of claim 1, wherein the borosilicate glass is phase separated.

7. The method of claim 1, wherein the controlled pore glass has a tap density of about 0.25 g/ml to about 0.40 g/ml.

8. The method of claim 1, wherein the controlled pore glass has an average pore size of between about 25 nm and about 500 nm.

9. The method of claim 1, wherein at least about 90% of the controlled pore glass have pore sizes within about ±25% of the average pore size.

* * * * *